(12) United States Patent
Tossens et al.

(10) Patent No.: US 10,863,742 B2
(45) Date of Patent: Dec. 15, 2020

(54) HERBICIDE COMBINATIONS

(71) Applicants: Bayer CropScience Aktiengesellschaft, Monheim am Rhein (DE); Bayer Aktiengesellschaft, Leverkusen (DE)

(72) Inventors: Herve Tossens, Verlaine (BE); Thomas Wilde, Weilrod-Hasselbach (DE); Fritz Wagener, Bad Camberg (DE); Steven Russel King, Duesseldorf (DE)

(73) Assignees: BAYER AKTIENGESELLSCHAFT, Leverkusen (DE); BAYER CROPSCIENCE AKTIENGESELLSCHAFT, Monheim am Rhein (DE)

( * ) Notice: Subject to any disclaimer, the term of this patent is extended or adjusted under 35 U.S.C. 154(b) by 0 days.

(21) Appl. No.: 16/471,202

(22) PCT Filed: Dec. 18, 2017

(86) PCT No.: PCT/EP2017/083302
§ 371 (c)(1),
(2) Date: Jun. 19, 2019

(87) PCT Pub. No.: WO2018/114796
PCT Pub. Date: Jun. 28, 2018

(65) Prior Publication Data
US 2019/0320656 A1    Oct. 24, 2019

(30) Foreign Application Priority Data
Dec. 21, 2016  (EP) .................................. 16205640

(51) Int. Cl.
| | | |
|---|---|---|
| *A01N 41/06* | (2006.01) | |
| *A01N 43/40* | (2006.01) | |
| *A01N 43/80* | (2006.01) | |
| *A01N 43/707* | (2006.01) | |
| *A01N 43/56* | (2006.01) | |

(52) U.S. Cl.
CPC ............. *A01N 43/40* (2013.01); *A01N 41/06* (2013.01); *A01N 43/56* (2013.01); *A01N 43/707* (2013.01); *A01N 43/80* (2013.01)

(58) Field of Classification Search
None
See application file for complete search history.

(56) References Cited

U.S. PATENT DOCUMENTS

| | | |
|---|---|---|
| 5,674,809 A | 10/1997 | Gamblin et al. |
| 5,990,048 A | 11/1999 | Dahmen et al. |
| 7,833,939 B2 | 11/2010 | Takahashi et al. |
| 9,700,045 B2 | 7/2017 | Schreiber et al. |
| 2016/0286815 A1 | 10/2016 | Lorenz et al. |

FOREIGN PATENT DOCUMENTS

| | | |
|---|---|---|
| DE | 19638886 A1 | 3/1998 |
| EP | 0531116 A1 | 3/1993 |
| WO | 2004/014138 A1 | 11/2005 |
| WO | 2008/075743 A1 | 6/2008 |
| WO | 2009/106259 A1 | 9/2009 |
| WO | 2009/141367 A2 | 11/2009 |
| WO | 2009/147205 A1 | 12/2009 |
| WO | 2014/001361 A1 | 1/2014 |
| WO | 2014/095719 A1 | 6/2014 |

OTHER PUBLICATIONS

PCT International Search Report for PCT/EP2017/083302, dated Mar. 23, 2018.

*Primary Examiner* — Alton N Pryor
(74) *Attorney, Agent, or Firm* — McBee Moore & Vanik IP, LLC

(57) ABSTRACT

The present invention primarily relates to herbicide combinations comprising (i) diflufenican (ii) pyroxasulfone and (iii) metribuzin to compositions comprising said herbicide combinations. The present invention further relates to a method of producing said herbicide combinations and compositions comprising said herbicide combinations. The present invention also relates to the use of said herbicide combinations and compositions comprising said herbicide combinations in the field of agriculture for controlling harmful plants.

14 Claims, No Drawings

HERBICIDE COMBINATIONS

CROSS-REFERENCE TO RELATED APPLICATIONS

This application is the National Stage entry of International Application No. PCT/EP2017/083302, filed 18 Dec. 2017, which claims priority to European Patent Application No. 16205640.2, filed 21 Dec. 2016.

BACKGROUND

Field

The present invention primarily relates to herbicide combinations comprising (i) diflufenican (ii) pyroxasulfone and (iii) metribuzin and to compositions comprising said herbicide combinations. The present invention further relates to a method for producing said herbicide combinations and compositions. The present invention also relates to the use of said herbicide combinations and compositions in the field of agriculture and for controlling harmful plants.

Description of Related Art

It is already known that diflufenican is a broad-spectrum pre- and early post-emergence herbicide for use in wheat and barley. It is often used in combination with other herbicides (WO 2009/106259, U.S. Pat. No. 5,674,809 and EP 0531116).

WO 2004/014138 describes isoxazoline derivatives including pyroxasulfone and their use as herbicide. Combinations comprising thereof are known from WO 2008/075743 and WO 2009/147205.

Metribuzin is an herbicide used both pre- and post-emergence in crops including soybean, corn, potatoes, tomatoes and sugar cane. It is often used in combination with other herbicides (DE19638886 A1).

The herbicidal crop protection agents (herbicides) and combinations/compositions thereof known to date for controlling harmful plants or unwanted vegetation have some disadvantages, above all (a) that they have no or else insufficient herbicidal activity against specific harmful plants, (b) that the spectrum of harmful plants which can be controlled with the herbicides is not broad enough, (c) that the selectivity of herbicides in and the compatibility with crops is too low, thereby causing unwanted damage and/or unwanted reduced harvest yields of the crops, (d) that the initial herbicidal activity is not acceptable or not strong enough and/or (e) that the herbicidal activity does not last long enough. For this reason there is a constant need to develop novel herbicidal combinations/compositions which have advantages over the known ones at least in some areas.

SUMMARY

Surprisingly, it has now been found that certain herbicide combinations or compositions comprising said herbicide combinations exhibit the desired herbicidal activity and are able to control harmful plants or unwanted vegetation in a more efficacious manner.

Furthermore, it has been found, that the combination according to the invention not only bring about the additive enhancement of the spectrum of action with respect to the harmful plants which can be controlled with the herbicides which was expected but achieves a synergistic effect which extends the range of action of the single components (i), (ii) and (iii) as well as the action of the respective two-way mixtures. Firstly, rates of application of the single components are lowered whilst the action remains equally good. Secondly, the combination still achieves a high degree of control of harmful plants even where the individual compounds have become totally ineffective in such a low application rate range. This allows, on the one hand, a substantial broadening of the spectrum of harmful plants that can be controlled and, on the other hand, increased safety in use.

The present invention relates to a combination of herbicides (herbicide combination) comprising or consisting of
(i) diflufenican,
(ii) pyroxasulfone and
(iii) metribuzin.

DETAILED DESCRIPTION OF A PREFERRED EMBODIMENT

Further, the present invention relates to a combination which comprises in addition to (i), (ii) and (iii) at least one additional herbicidal active ingredient of group I consisting of: aclonifen, bromoxynil, bromoxynil-butyrate, -potassium, -heptanoate, and -octanoate, benzofenap, butachlor, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, flufenacet, fluroxypyr, fluroxypyr-meptyl, foramsulfuron, iodosulfuron, iodosulfuron-methyl-sodium, isoproturon, isoxaflutole, mefenacet, mesosulfuron, mesosulfuron-methyl, metolachlor, S-metolachlor, metribuzin, metosulam, nicosulfuron, oxadiargyl, oxadiazon, pethoxamid, prosulfocarb, pyrasulfotole, pyroxsulam, tefuryltrione, tembotrione, thiencarbazone, thiencarbazone-methyl, triafamone, pendimethalin, propoxycarbazone, halauxifen-methyl, 2-methyl-4-chlorophenoxyacetic acid (MCPA).

Further, the present invention relates to a combination which comprises in addition to (i), (ii) and (iii) at least one safener.

Further, the present invention relates to a combination which comprises in addition to (i), (ii) and (iii) at least one additional herbicidal active ingredient of group I and at least one safener.

The salts of compounds used in the context of the present invention may be used in the form of the respective agronomically acceptable salts, such as alkali metal salts, alkaline earth salts or ammonium salts.

Definitions

Herbicidal Active Ingredient (Group I):
aclonifen, bromoxynil, bromoxynil-butyrate, -potassium, -heptanoate, and -octanoate, benzofenap, butachlor, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, flufenacet, fluroxypyr, fluroxypyr-meptyl, foramsulfuron, iodosulfuron, iodosulfuron-methyl-sodium, isoproturon, isoxaflutole, mefenacet, mesosulfuron, mesosulfuron-methyl, metolachlor, S-metolachlor, metribuzin, metosulam, nicosulfuron, oxadiargyl, oxadiazon, pethoxamid, prosulfocarb, pyrasulfotole, pyroxsulam, tefuryltrione, tembotrione, thiencarbazone, thiencarbazone-methyl, triafamone, pendimethalin, propoxycarbazone, halauxifen-methyl, 2-methyl-4-chlorophenoxyacetic acid (MCPA).

Safener:
S1) Compounds of the group of heterocyclic carboxylic acid derivatives:
S1$^a$) Compounds of the type of dichlorophenylpyrazoline-3-carboxylic acid (S1$^a$), preferably compounds such as 1-(2,4-dichlorophenyl)-5-(ethoxycarbonyl)-5-methyl-2-pyrazoline-3-carboxylic acid, ethyl 1-(2,4-dichlorophenyl)-5-(ethoxycarbonyl)-5-methyl-2-pyrazoline-3-carboxylate (S1-1) ("mefenpyr(-diethyl)"), and related compounds, as described in WO-A-91/07874;
S1$^b$) Derivatives of dichlorophenylpyrazolecarboxylic acid (S1$^b$), preferably compounds such as ethyl 1-(2,4-dichlorophenyl)-5-methylpyrazole-3-carboxylate (S1-2), ethyl 1-(2,4-dichlorophenyl)-5-isopropylpyrazole-3-carboxylate (S1-3), ethyl 1-(2,4-dichlorophenyl)-5-(1,1-dimethylethyl)pyrazole-3-carboxylate (S1-4) and related compounds, as described in EP-A-333 131 and EP-A-269 806;
S1$^c$) Derivatives of 1,5-diphenylpyrazole-3-carboxylic acid (S1$^c$), preferably compounds such as ethyl 1-(2,4-dichlorophenyl)-5-phenylpyrazole-3-carboxylate (S1-5), methyl 1-(2-chlorophenyl)-5-phenylpyrazole-3-carboxylate (S1-6) and related compounds, as described, for example, in EP-A-268554;
S1$^d$) Compounds of the type of triazolecarboxylic acids (S1$^d$), preferably compounds such as fenchlorazole(-ethyl), i.e. ethyl 1-(2,4-dichlorophenyl)-5-trichloromethyl-(1H)-1,2,4-triazole-3-carboxylate (S1-7), and related compounds, as described in EP-A-174 562 and EP-A-346 620;
S1$^e$) Compounds of the type of 5-benzyl- or 5-phenyl-2-isoxazoline-3-carboxylic acid or 5,5-diphenyl-2-isoxazoline-3-carboxylic acid (S1$^e$), preferably compounds such as ethyl 5-(2,4-dichlorobenzyl)-2-isoxazoline-3-carboxylate (S1-8) or ethyl 5-phenyl-2-isoxazoline-3-carboxylate (S1-9) and related compounds, as described in WO-A-91/08202, or 5,5-diphenyl-2-isoxazolinecarboxylic acid (S1-10) or ethyl 5,5-diphenyl-2-isoxazolinecarboxylate (S1-11) ("isoxadifen-ethyl") or n-propyl 5,5-diphenyl-2-isoxazolinecarboxylate (S1-12) or ethyl 5-(4-fluorophenyl)-5-phenyl-2-isoxazoline-3-carboxylate (S1-13), as described in the patent application WO-A-95/07897.
S2) Compounds of the group of 8-quinolinoxy derivatives (S2):
S2$^a$) Compounds of the type of 8-quinolinoxyacetic acid (S2$^a$), preferably 1-methylhexyl (5-chloro-8-quinolinoxy)acetate (common name "cloquintocet-mexyl" (S2-1), 1,3-dimethyl-but-1-yl (5-chloro-8-quinolinoxy) acetate (S2-2), 4-allyloxybutyl (5-chloro-8-quinolinoxy)acetate (S2-3), 1-allyloxyprop-2-yl (5-chloro-8-quinolinoxy)acetate (S2-4), ethyl (5-chloro-8-quinolinoxy)acetate (S2-5), methyl (5-chloro-8-quinolinoxy)acetate (S2-6), allyl (5-chloro-8-quinolinoxy)acetate (S2-7), 2-(2-propylideneiminoxy)-1-ethyl (5-chloro-8-quinolinoxy)acetate (S2-8), 2-oxoprop-1-yl (5-chloro-8-quinolinoxy)acetate (S2-9) and related compounds, as described in EP-A-86 750, EP-A-94 349 and EP-A-191 736 or EP-A-0 492 366, and also (5-chloro-8-quinolinoxy)acetic acid (S2-10), its hydrates and salts, for example its lithium, sodium, potassium, calcium, magnesium, aluminium, iron, ammonium, quaternary ammonium, sulphonium or phosphonium salts, as described in WO-A-2002/34048;
S2$^b$) Compounds of the type of (5-chloro-8-quinolinoxy) malonic acid (S2$^b$), preferably compounds such as diethyl (5-chloro-8-quinolinoxy)malonate, diallyl (5-chloro-8-quinolinoxy)malonate, methyl ethyl (5-chloro-8-quinolinoxy)malonate and related compounds, as described in EP-A-0 582 198.
S3) Active compounds of the type of dichloroacetamides (S3) which are frequently used as pre-emergence safeners (soil-acting safeners), such as, for example, "dichlormid" (N,N-diallyl-2,2-dichloroacetamide) (S3-1),
"R-29148" (3-dichloroacetyl-2,2,5-trimethyl-1,3-oxazolidine) (S3-2),
"R-28725" (3-dichloroacetyl-2,2-dimethyl-1,3-oxazolidine) (S3-3),
"benoxacor" (4-dichloroacetyl-3,4-dihydro-3-methyl-2H-1,4-benzoxazine) (S3-4),
"PPG-1292" (N-allyl-N-[(1,3-dioxolan-2-yl)methyl] dichloroacetamide) (S3 5),
"DKA-24" (N-allyl-N-[(allylaminocarbonyl)methyl] dichloroacetamide) (S3-6),
"AD-67" or "MON 4660" (3-dichloroacetyl-1-oxa-3-aza-spiro[4,5]decane) (S3-7),
"TI-35" (1-dichloroacetylazepane) (S3-8)
"diclonon" (dicyclonon) (S3-9)
((RS)-1-dichloroacetyl-3,3,8a-trimethylperhydropyrrolo[1,2-a]pyrimidin-6-one), furilazole" or "MON 13900" ((RS)-3-dichloroacetyl-5-(2-furyl)-2,2-dimethyloxazolidine) (S3-10),
and also its (R)-isomer (S3-11).
S4) Compounds of the class of acylsulphonamides (S4):
S4$^a$) N-acylsulphonamides of the formula (S4$^a$) and salts thereof, as described in WO-A-97/45016

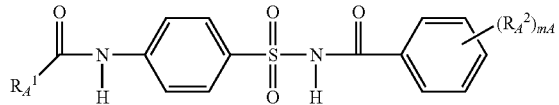

(S4$^a$)

in which
$R_A^1$ is $(C_1-C_6)$-alkyl, $(C_3-C_6)$-cycloalkyl, where the 2 last-mentioned radicals are substituted by $v_A$ substituents from the group consisting of halogen, $(C_1-C_4)$-alkoxy, halo-$(C_1-C_6)$-alkoxy and $(C_1-C_4)$-alkylthio and, in the case of cyclic radicals, also $(C_1-C_4)$-alkyl and $(C_1-C_4)$-haloalkyl;
$R_A^2$ is halogen, $(C_1-C_4)$-alkyl, $(C_1-C_4)$-alkoxy, $CF_3$,
$m_A$ is 1 or 2;
$v_D$ is 0, 1, 2 or 3;
S4$^b$) Compounds of the type of 4-(benzoylsulphamoyl) benzamides of the formula (S4$^b$) and salts thereof, as described in WO-A-99/16744,

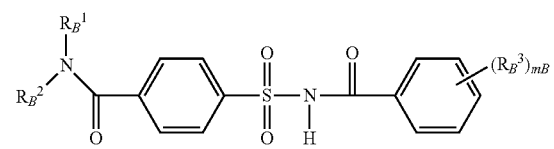

(S4$^b$)

in which
- $R_B^1$, $R_B^2$ independently of one another are hydrogen, $(C_1-C_6)$-alkyl, $(C_3-C_6)$-cycloalkyl, $(C_3-C_6)$-alkenyl, $(C_3-C_6)$-alkynyl,
- $R_B^3$ is halogen, $(C_1-C_4)$-alkyl, $(C_1-C_4)$-haloalkyl or $(C_1-C_4)$-alkoxy,
- $m_B$ is 1 or 2;

for example those in which
- $R_B^1$=cyclopropyl, $R_B^2$=hydrogen and $(R_B^3)$=2-OMe ("cyprosulfamide", S4-1),
- $R_B^1$=cyclopropyl, $R_B^2$=hydrogen and $(R_B^3)$=5-Cl-2-OMe (S4-2),
- $R_B^1$=ethyl, $R_B^2$=hydrogen and $(R_B^3)$=2-OMe (S4-3),
- $R_B^1$=isopropyl, $R_B^2$=hydrogen and $(R_B^3)$=5-Cl-2-OMe (S4-4) and
- $R_B^1$=isopropyl, $R_B^2$=hydrogen and $(R_B^3)$=2-OMe (S4-5);

S4$^c$) Compounds of the class of benzoylsulphamoylphenylureas of the formula (S4$^c$) as described in EP-A-365484,

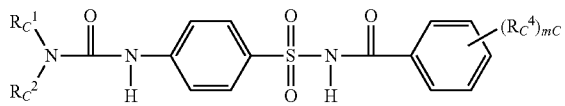

(S4$^c$)

in which
- $R_C^1$, $R_C^2$ independently of one another are hydrogen, $(C_1-C_8)$-alkyl, $(C_3-C_8)$-cycloalkyl, $(C_3-C_6)$-alkenyl, $(C_3-C_6)$-alkynyl,
- $R_C^3$ is halogen, $(C_1-C_4)$-alkyl, $(C_1-C_4)$-alkoxy, $CF_3$,
- $m_C$ is 1 or 2;

for example
1-[4-(N-2-methoxybenzoylsulphamoyl)phenyl]-3-methylurea, 1-[4-(N-2-methoxybenzoylsulphamoyl)phenyl]-3,3-dimethylurea, 1-[4-(N-4,5-dimethylbenzoylsulphamoyl)phenyl]-3-methylurea;

S4$^d$) Compounds of the type of N-phenylsulphonylterephthalamides of the formula (S4$^d$) and salts thereof, which are known, for example, from CN 101838227,

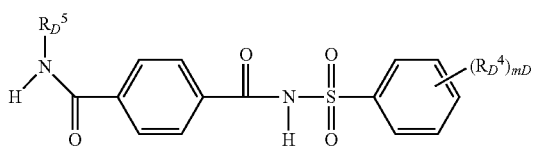

(S4$^d$)

in which
- $R_D^4$ is halogen, $(C_1-C_4)$-alkyl, $(C_1-C_4)$-alkoxy, $CF_3$;
- $m_D$ is 1 or 2;
- $R_D^5$ is hydrogen, $(C_1-C_6)$-alkyl, $(C_3-C_6)$-cycloalkyl, $(C_2-C_6)$-alkenyl, $(C_2-C_6)$-alkynyl, $(C_5-C_6)$-cycloalkenyl.

S5) Active compounds from the class of hydroxyaromatics and aromatic-aliphatic carboxylic acid derivatives (S5), for example ethyl 3,4,5-triacetoxybenzoate, 3,5-dimethoxy-4-hydroxybenzoic acid, 3,5-dihydroxybenzoic acid, 4-hydroxy salicylic acid, 4-fluorosalicylic acid, 2-hydroxycinnamic acid, 2,4-dichlorocinnamic acid, as described in WO-A-2004/084631, WO-A-2005/015994, WO-A-2005/016001.

S6) Active compounds from the class of 1,2-dihydroquinoxalin-2-ones (S6), for example 1-methyl-3-(2-thienyl)-1,2-dihydroquinoxalin-2-one, 1-methyl-3-(2-thienyl)-1,2-dihydroquinoxaline-2-thione, 1-(2-aminoethyl)-3-(2-thienyl)-1,2-dihydroquinoxalin-2-one hydrochloride, 1-(2-methylsulphonylaminoethyl)-3-(2-thienyl)-1,2-dihydroquinoxalin-2-one, as described in WO-A-2005/112630.

S7) Compounds from the class of diphenylmethoxyacetic acid derivatives (S7), for example methyl diphenylmethoxyacetate (CAS-Reg. Nr. 41858-19-9) (S7-1), ethyl diphenylmethoxyacetate, or diphenylmethoxyacetic acid, as described in WO-A-98/38856.

S8) Compounds of the formula (S8), as described in WO-A-98/27049,

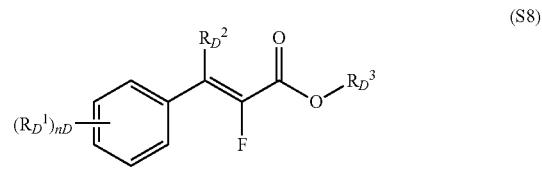

(S8)

where the symbols and indices have the following meanings:
- $R_D^1$ is halogen, $(C_1-C_4)$-alkyl, $(C_1-C_4)$-haloalkyl, $(C_1-C_4)$-alkoxy, $(C_1-C_4)$-haloalkoxy,
- $R_D^2$ is hydrogen or $(C_1-C_4)$-alkyl,
- $R_D^3$ is hydrogen, $(C_1-C_8)$-alkyl, $(C_2-C_4)$-alkenyl, $(C_2-C_4)$-alkynyl or aryl, where each of the carbon-containing radicals mentioned above is unsubstituted or substituted by one or more, preferably by up to three, identical or different radicals from the group consisting of halogen and alkoxy; or salts thereof,
- $n_D$ is an integer from 0 to 2.

S9) Active compounds from the class of 3-(5-tetrazolylcarbonyl)-2-quinolones (S9), for example 1,2-dihydro-4-hydroxy-1-ethyl-3-(5-tetrazolylcarbonyl)-2-quinolone (CAS Reg. No.: 219479-18-2), 1,2-dihydro-4-hydroxy-1-methyl-3-(5-tetrazolylcarbonyl)-2-quinolone (CAS Reg. No.: 95855-00-8), as described in WO-A-1999/000020.

S10) Compounds of the formula (S10$^a$) or (S10$^b$) as described in WO-A-2007/023719 and WO-A-2007/023764

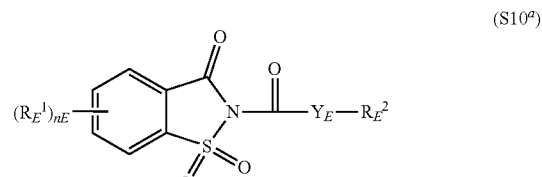

(S10$^a$)

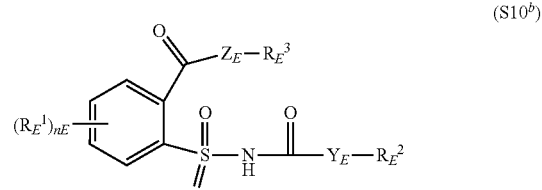

(S10$^b$)

in which $R_E^1$ is halogen, $(C_1-C_4)$-alkyl, methoxy, nitro, cyano, $CF_3$, $OCF_3$ $Y_E$, $Z_E$ independently of one another are O or S, $n_E$ is an integer from 0 to 4, $R_E^2$ is $(C_1-C_{16})$-alkyl, $(C_2-C_6)$-alkenyl, $(C_3-C_6)$-cycloalkyl, aryl; benzyl, halobenzyl, $R_E^3$ is hydrogen or $(C_1-C_6)$-alkyl.

S11) Active compounds of the type of oxyimino compounds (S11), which are known as seed dressings, such as, for example, "oxabetrinil" ((Z)-1,3-dioxolan-2-yl-methoxyimino(phenyl)acetonitrile) (S11-1), which is known as seed dressing safener for millet against metolachlor damage, "fluxofenim" (1-(4-chlorophenyl)-2,2,2-trifluoro-1-ethanone O-(1,3-dioxolan-2-ylmethyl)oxime) (S11-2), which is known as seed dressing safener for millet against metolachlor damage, and "cyometrinil" or "CGA-43089" ((Z)-cyanomethoxy-imino(phenyl)acetonitrile) (S11-3), which is known as seed dressing safener for millet against metolachlor damage.

S12) Active compounds from the class of isothiochromanones (S12), such as, for example, methyl [(3-oxo-1H-2-benzothiopyran-4(3H)-ylidene)methoxy]acetate (CAS Reg. No.: 205121-04-6) (S12-1) and related compounds from WO-A-1998/13361.

S13) One or more compounds from group (S13):

"naphthalic anhydrid" (1,8-naphthalenedicarboxylic anhydride) (S13-1), which is known as seed dressing safener for corn against thiocarbamate herbicide damage, "fenclorim" (4,6-dichloro-2-phenylpyrimidine) (S13-2), which is known as safener for pretilachlor in sown rice, "flurazole" (benzyl 2-chloro-4-trifluoromethyl-1,3-thiazole-5-carboxylate) (S13-3), which is known as seed dressing safener for millet against alachlor and metolachlor damage, "CL 304415" (CAS Reg. No.: 31541-57-8) (4-carboxy-3,4-dihydro-2H-1-benzopyran-4-acetic acid) (S13-4) from American Cyanamid, which is known as safener for corn against imidazolinone damage, "MG 191" (CAS Reg. No.: 96420-72-3) (2-dichloromethyl-2-methyl-1,3-dioxolane) (S13-5) which is known as safener for corn, "MG 838" (CAS Reg. No.: 133993-74-5) (2-propenyl 1-oxa-4-azaspiro[4.5]decane-4-carbodithioate) (S13-6), "disulphoton" (O,O-diethyl S-2-ethylthioethyl phosphorodithioate) (S13-7), "dietholate" (O,O-diethyl O-phenyl phosphorothioate) (S13-8), "mephenate" (4-chlorophenyl methylcarbamate) (S13-9).

S14) Active compounds which, besides a herbicidal effect against harmful plants, also have a safener effect on crop plants such as rice, such as, for example, "dimepiperate" or "MY 93" (S-1-methyl-1-phenylethyl piperidine-1-carbothioate), which is known as safener for rice against molinate herbicide damage, "daimuron" or "SK 23" (1-(1-methyl-1-phenylethyl)-3-p-tolylurea), which is known as safener for rice against imazosulphuron herbicide damage, "cumyluron"="JC 940" (3-(2-chlorophenylmethyl)-1-(1-methyl-1-phenylethyl)urea, see JP-A-60087254), which is known as safener for rice against some herbicide damage, "methoxyphenone" or "NK 049" (3,3'-dimethyl-4-methoxybenzophenone), which is known as safener for rice against some herbicide damage, "CSB" (1-bromo-4-(chloromethylsulphonyl)benzene) from Kumiai (CAS Reg. No. 54091-06-4), which is known as safener against some herbicide damage in rice.

S15) Compounds of the formula (S15) or its tautomers,

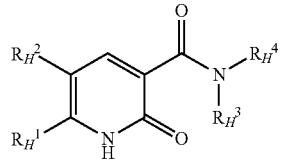

(S15)

as described in WO-A-2008/131861 and WO-A-2008/131860, in which $R_H^1$ is $(C_1-C_6)$-haloalkyl, $R_H^2$ is hydrogen or halogen, $R_H^3$, $R_H^4$ independently of one another are hydrogen, $(C_1-C_{16})$-alkyl, $(C_2-C_{16})$-alkenyl or $(C_2-C_{16})$-alkynyl, where each of the 3 last-mentioned radicals is unsubstituted or substituted by one or more radicals from the group consisting of halogen, hydroxy, cyano, $(C_1-C_4)$-alkoxy, haloalkoxy, $(C_1-C_4)$-alkylthio, $(C_1-C_4)$-alkylamino, di-[$(C_1-C_4)$-alkyl]-amino, [$(C_1-C_4)$-alkoxy]-carbonyl, [$(C_1-C_4)$-haloalkoxy]-carbonyl, unsubstituted or substituted $(C_3-C_6)$-cycloalkyl, unsubstituted or substituted phenyl, and unsubstituted or substituted heterocyclyl;

or $(C_3-C_6)$-cycloalkyl, $(C_4-C_6)$-cycloalkenyl, $(C_3-C_6)$-cycloalkyl which is at one site of the ring condensed with a 4 to 6-membered saturated or unsaturated carbocyclic ring, or $(C_4-C_6)$-cycloalkenyl which is at one site of the ring condensed with a 4 to 6-membered saturated or unsaturated carbocyclic ring, where each of the 4 last-mentioned radicals is unsubstituted or substituted by one or more radicals from the group consisting of halogen, hydroxy, cyano, $(C_1-C_4)$-alkyl, $(C_1-C_4)$-haloalkyl, $(C_1-C_4)$-alkoxy, $(C_1-C_4)$-haloalkoxy, $(C_1-C_4)$-alkylthio, $(C_1-C_4)$-alkylamino, di-$(C_1-C_4)$-alkyl]-amino, [$(C_1-C_4)$-alkoxy]-carbonyl, [$(C_1-C_4)$-haloalkoxy]-carbonyl, unsubstituted or substituted $(C_3-C_6)$-cycloalkyl, unsubstituted or substituted phenyl, and unsubstituted or substituted heterocyclyl; or $R_H^3$ is $(C_1-C_4)$-alkoxy, $(C_2-C_4)$-alkenyloxy, $(C_2-C_6)$-alkynyloxy or $(C_2-C_4)$-haloalkoxy, and $R_H^4$ is hydrogen or $(C_1-C_4)$-alkyl, or $R_H^3$ and $R_H^4$ together with the directly bound N-atom are a 4 to 8-membered heterocyclic ring, which can contain further hetero ring atoms besides the N-atom, preferably up to two further hetero ring atoms from the group consisting of N, O and S, and which is unsubstituted or substituted by one or more radicals from the group consisting of halogen, cyano, nitro, $(C_1-C_4)$-alkyl, $(C_1-C_4)$-haloalkyl, $(C_1-C_4)$-alkoxy, $(C_1-C_4)$-haloalkoxy, and $(C_1-C_4)$-alkylthio.

Herbicides

The herbicides used in the context of the present invention are known per se, and described inter alia in "The Pesticide Manual", 16th edition, The British Crop Protection Council and the Royal Soc. of Chemistry, 2012 and the literature cited therein.

Combination/Composition

Compositions within the context of the present invention comprise in addition to the combinations according to the invention one or more further component(s) selected from the group consisting of formulation auxiliaries, additives customary in crop protection, and further agrochemically active compounds.

Preferred is a combination according to the invention wherein fenchlorazole-ethyl (S1), mefenpyr-diethyl (S2), isoxadifen-ethyl (S3), cyprosulfamide (S4), cloquintocet-mexyl (S5), fenclorim (S6), dichlormid (S7), benoxacor (S8), furilazole (S9), oxabetrinil (S10), fluxofenim (S11), flurazole (S12) or naphthalic anhydride (S13) is the safener.

More preferred is a combination according to the invention wherein mefenpyr-diethyl (S2), isoxadifen-ethyl (S3), cyprosulfamide (S4) or cloquintocet-mexyl (S5) is the safener.

Most preferred is a combination according to the invention wherein mefenpyr-diethyl (S2) or cyprosulfamide (S4) is the safener.

The weight ratio of the combination according to the invention can be described by the weight of the total amount of component (i) to the total amount of component (ii) and the weight of the total amount of component (i) to the total amount of component (iii), which is as follows:

(i) to (ii) in the range of from 1000:1 to 1:1000 and for (i) to (iii) in the range of from 1000:1 to 1:1000.

Preferably, the ratio by weight of the total amount of component (i) to the total amount of component (ii) in a herbicide combination according to the present invention is in the range of from 100:1 to 1:100.

Preferably, the ratio by weight of the total amount of component (i) to the total amount of component (iii) in a herbicide combination according to the present invention is in the range of from 100:1 to 1:100.

More preferably, the ratio by weight of the total amount of component (i) to the total amount of component (ii) in a herbicide combination according to the present invention is in the range of from 10:1 to 1:10.

More preferably, the ratio by weight of the total amount of component (i) to the total amount of component (iii) in a herbicide combination according to the present invention is in the range of from 10:1 to 1:10.

Superadditive (=synergistic) effects occur when components (i), (ii) and (iii) are used jointly. The action in the combinations is in this connection stronger than the sum to be expected of the actions of the individual herbicides used. The synergistic effects allow a reduction in the amount expended the combating of a broader spectrum of weeds, a faster onset of the herbicidal action, a longer lasting action, better control of the harmful plants, with only one or a few applications, and a broadening of the possible application period.

The properties and advantages mentioned are of use for controlling harmful plants or unwanted vegetation and accordingly to safeguard and/or to increase the yields in terms of quality and quantity. The technical standard is, with regard to the properties described, clearly exceeded by these new combinations.

The combination(s)/composition(s) according to the present invention can be employed for controlling harmful plants in genetically modified crops or crops obtained by mutation/selection. These crops are distinguished as a rule by particular, advantageous properties, such as resistances to herbicidal combinations/compositions or resistances to plant diseases or causative agents of plant diseases such as particular insects or microorganisms such as fungi, bacteria or viruses. Other particular properties relate, for example, to the harvested material with regard to quantity, quality, storability, composition and specific constituents. Thus, for example, transgenic plants are known whose starch content is increased or whose starch quality is altered, or those where the harvested material has a different fatty acid composition.

The present invention also relates to a method for controlling harmful plants or unwanted vegetation, which comprises applying a herbicide combination/composition according to the present invention by pre-emergence, early post-emergence or post-emergence treatment to harmful plants or unwanted vegetation, parts of said harmful plants or unwanted vegetation, or the area where the harmful plants or unwanted vegetation grow, for example the area under cultivation.

In the context of the present invention "controlling" denotes a significant reduction of the growth of the harmful plant(s) in comparison to the untreated harmful plants. Preferably, the growth of the harmful plant(s) is essentially diminished (60-79%), more preferably the growth of the harmful plant(s) is largely or fully suppressed (80-100%), and in particular the growth of the harmful plant(s) is almost fully or fully suppressed (90-100%).

If the herbicide combination(s)/composition(s) according to the present invention is applied to the soil surface before or after germination of the crop plant but prior to emergence from the soil, the treatment is a pre-emergence treatment.

If the herbicide combination(s)/composition(s) according to the present invention is applied to the soil surface after emergence of the crop plant, the treatment is a post-emergence treatment.

Preferred is the use as pre-emergence herbicide and early post-emergence herbicide.

More preferred is the use as pre-emergence herbicide.

The combination according to the invention can be used for many crop plants (e.g. in wheat, barley, corn and soybean). They are also very suitable for use in transgenic crops.

Preferred is the use in soybean.

Most preferred is the use as pre-emergence herbicide in soybean.

The application rates (indicated as g/ha i.e. grams of active ingredient per hectare), of the herbicide combination (i), (ii) and (iii)) used in the context of the present invention, are as defined as follows:

TABLE 1

|  | (i) in g/ha | (ii) in g/ha | (iii) in g/ha |
| --- | --- | --- | --- |
|  | 1000 to 1 | 1000 to 1 | 1000 to 1 |
| Preferred | 500 to 10 | 500 to 10 | 500 to 10 |
| More preferred | 500 to 50 | 500 to 25 | 500 to 50 |
| Most preferred | 200 to 50 | 300 to 25 | 500 to 50 |

The herbicide combination(s)/composition(s) according to the present invention have an outstanding herbicidal activity against a broad spectrum of economically important harmful monocotyledonous and dicotyledonous harmful plants.

Specifically, examples may be mentioned of some representatives of the monocotyledonous and dicotyledonous weed flora which can be controlled by the herbicide combination/composition according to the present invention, without the enumeration being a restriction to certain species.

In the context of the present text, reference may be made to growth stages according to the BBCH monograph "Growth stages of mono- and dicotyledonous plants", $2^{nd}$ edition, 2001, ed. Uwe Meier, Federal Biological Research Centre for Agriculture and Forestry (Biologische Bundesanstalt für Land und Forstwirtschaft).

Examples of monocotyledonous harmful plants on which the herbicide combination/composition according to the present invention act efficiently are from amongst the genera *Hordeum* spp., *Echinochloa* spp., *Poa* spp., *Bromus* spp., *Digitaria* spp., *Eriochloa* spp., *Setaria* spp., *Pennisetum* spp., *Eleusine* spp., *Eragrostis* spp., *Panicum* spp., *Lolium* spp., *Brachiaria* spp., *Leptochloa* spp., *Avena* spp., *Cyperus* spp., *Axonopris* spp., *Sorghum* spp., and *Melinus* spp.

Particular examples of monocotyledonous harmful plants species on which the herbicide combination/composition according to the present invention act efficiently are selected from amongst the species *Hordeum murinum, Echinochloa crus-galli, Poa annua, Bromus rubens* L., *Bromus rigidus, Bromus secalinus* L., *Digitaria insularis, Digitaria sanguinalis, Eriochloa gracilis, Setaria faberi, Setaria viridis, Pennisetum glaucum, Eleusine indica, Eragrostis pectinacea, Panicum miliaceum, Lolium multiflorum, Brachiaria platyphylla, Leptochloa fusca, Avena fatua, Cyperus compressus, Cyperus esculentes, Axonopris offinis, Sorghum halapense*, and *Melinus repens*.

Examples of dicotyledonous harmful plants on which the herbicide combination/composition according to the present invention act efficiently are from amongst the genera *Amaranthus* spp., *Polygonum* spp., *Medicago* spp., *Mollugo* spp., *Cyclospermum* spp., *Stellaria* spp., *Gnaphalium* spp., *Taraxacum* spp., *Oenothera* spp., *Amsinckia* spp., *Erodium* spp., *Erigeron* spp., *Senecio* spp., *Lamium* spp., *Kochia* spp., *Chenopodium* spp., *Lactuca* spp., *Malva* spp., *Ipomoea* spp., *Brassica* spp., *Sinapis* spp., *Urtica* spp., *Sida* spp, *Portulaca* spp., *Richardia* spp., *Ambrosia* spp., *Calandrinia* spp., *Sisymbrium* spp., *Sesbania* spp., *Capsella* spp., *Sonchus* spp., *Euphorbia* spp., *Helianthus* spp., *Coronopus* spp., *Salsola* spp., *Abutilon* spp., *Vicia* spp., *Epilobium* spp., *Cardamine* spp., *Picris* spp., *Trifolium* spp., *Galinsoga* spp., *Epimedium* spp., *Marchantia* spp., *Solanum* spp., *Oxalis* spp., *Metricaria* spp., *Plantago* spp., *Tribulus* spp., *Cenchrus* spp. *Bidens* spp., *Veronica* spp., and *Hypochaeris* spp.

Particular examples of dicotyledonous harmful plants species on which the herbicide combination/composition according to the present invention act efficiently are selected from amongst the species *Amaranthus spinosus, Amaranthus palmer, Amaranthis rudis, Polygonum convolvulus, Medicago polymorpha, Mollugo verticillata, Cyclospermum leptophyllum, Stellaria media, Gnaphalium purpureum, Taraxacum officinale, Oenothera laciniata, Amsinckia intermedia, Erodium cicutarium, Erodium moschatum, Erigeron bonariensis, Senecio vulgaris, Lamium amplexicaule, Erigeron canadensis, Polygonum aviculare, Kochia scoparia, Chenopodium album, Lactuca serriola, Malva parviflora, Malva neglecta, Ipomoea hederacea, Ipomoea lacunose, Brassica nigra, Sinapis arvensis, Urtica dioica, Amaranthus blitoides, Amaranthus retroflexus, Amaranthus hybridus, Amaranthus lividus, Sida spinosa, Portulaca oleracea, Richardia scabra, Ambrosia artemisiifolia, Calandrinia caulescens, Sisymbrium irio, Sesbania exaltata, Capsella bursa-pastoris, Sonchus oleraceus, Euphorbia maculate, Helianthus annuus, Coronopus didymus, Salsola tragus, Abutilon theophrasti, Vicia benghalensis* L., *Epilobium paniculatum, Cardamine* spp, *Picris echioides, Trifolium* spp., *Galinsoga* spp., *Epimedium* spp., *Marchantia* spp., *Solanum* spp., *Oxalis* spp., *Metricaria matriccarioides, Plantago* spp., *Tribulus terrestris, Salsola kali, Cenchrus* spp., *Bidens bipinnata, Veronica* spp., and *Hypochaeris radicata*.

The herbicide combination(s)/composition(s) according to the present invention are easily and readily obtained, by combining the components (i), (ii) and (iii) in the ratio by weight as defined in the context of the present invention, for example by mixing the appropriate amounts of components (i), (ii) and (iii).

Thus, in a further aspect, the present invention relates to a method for producing combination(s) of herbicides according to the present invention and to a method of producing the composition(s) according to the present invention comprising the steps of
  (a) providing component (i),
  (b) providing component (ii),
  (c) providing component (iii),
  (c) combining component (i), component (ii) and component (iii), such that a combination of herbicides according to the present invention or a composition according to the present invention is obtained.

The herbicides (i), (ii) and (iii) used in the herbicide combination(s)/composition(s) according to the present invention are applied once, twice or three times per Gregorian calendar year, i.e. in one application, in two applications or in three applications per year according to the Gregorian calendar.

Furthermore, the herbicides (i), (ii) and (iii) as defined herein can be used together with other agrochemically active compounds, for example from the group of safener, fungicides, insecticides, other herbicides and other plant growth regulators, or with formulation auxiliaries and additives customary in crop protection. Additives are, for example, fertilizers and colorants.

The herbicide combination(s)/composition(s) according to the present invention cannot only be used as mixed formulations which are then applied in the customary manner as a dilution with water, but also as so-called tank mixes by jointly diluting the separately formulated, or partially separately formulated, components with water.

The herbicide combination(s)/composition(s) according to the present invention can be formulated in various ways, depending on the prevailing biological and/or chemical-physical parameters. The following are examples of general possibilities for formulations: wettable powders (WP), water-soluble concentrates, emulsifiable concentrates (EC), aqueous solutions (SL), emulsions (EW) such as oil-in-water and water-in-oil emulsions, sprayable solutions or emulsions, suspension concentrates (SC), oil dispersions (OD), oil- or water-based dispersions, suspoemulsions, dusts (DP), seed-dressing materials, granules for soil application or for broadcasting, or water-dispersible granules (WG), ULV formulations, microcapsules (e.g. CS) or waxes.

The individual formulation types are known in principle and are described for example, in: Winnacker-Küchler, "Chemische Technologic", Volume 7, C. Hauser Verlag Munich, $4^{th}$ Edition, 1986; van Valkenburg, "Pesticide Formulations", Marcel Dekker N.Y., 1973; K. Martens, "Spray Drying Handbook", 3rd Ed. 1979, G. Goodwin Ltd. London.

The formulation auxiliaries required, such as inert materials, surfactants, solvents and other additives are also known and are described, for example, in Watkins, "Handbook of Insecticide Dust Diluents and Carriers", 2nd Ed., Darland Books, Caldwell, N.J.; H.v. Olphen, "Introduction to Clay Colloid Chemistry"; 2nd Ed., J. Wiley & Sons, N.Y. Marsden, "Solvents Guide", 2nd Ed., Interscience, N.Y. 1950; McCutcheon's, "Detergents and Emulsifiers Annual", MC Publ. Corp., Ridgewood, N.J.; Sisley and Wood, "Encyclopedia of Surface Active Agents", Chem. Publ. Co. Inc., N.Y. 1964; Schonfeldt, "Grenzflächenaktive Äthylenoxidaddukte" [Surface-active ethylene oxide adducts], Wiss. Verlagsgesellschaft, Stuttgart 1976, Winnacker-Küchler, "Chemische Technologic", Volume 7, C. Hauser Verlag Munich, 4$^{th}$ Edition 1986.

Wettable powders (sprayable powders) are products which are uniformly dispersible in water and which, besides the active compound, also comprise ionic or nonionic surfactants (wetters, dispersants), for example polyoxethylated alkylphenols, polyethoxylated fatty alcohols or fatty amines, alkanesulfonates or alkylbenzenesulfonates, sodium lignosulfonate, sodium 2,2'-dinaphthylmethane-6,6'-disulfonate, sodium dibutylnaphthalenesulfonate or else sodium oleoylmethyltauride, in addition to a diluent or inert material.

Emulsifiable concentrates are prepared by dissolving the active compound in an organic solvent, for example butanol, cyclohexanone, dimethylformamide, xylene or else higher-boiling aromatics or hydrocarbons with addition of one or more ionic or nonionic surfactants (emulsifiers). Examples of emulsifiers which may be used are: calcium salts of alkylarylsulfonic acids, such as calcium dodecylbenzene sulfonate, or nonionic emulsifiers such as fatty acid poly glycol esters, alkylaryl poly glycol ethers, fatty alcohol poly glycol ethers, propylene oxide/ethylene oxide condensates, alkyl polyethers, sorbitan fatty acid esters, polyoxyethylene sorbitan fatty acid esters or polyoxethylene sorbitol esters.

Dusts are obtained by grinding the active compound with finely divided solid materials, for example talc, natural clays such as kaolin, bentonite and pyrophyllite, or diatomaceous earth.

Suspension concentrates (SC) can be water- or oil-based. They can be prepared, for example, by wet grinding by means of commercially available bead mills and, if appropriate, addition of further surfactants as they have already been mentioned for example above in the case of the other formulation types.

Emulsions, for example oil-in-water emulsions (EW), can be prepared for example by means of stirrers, colloid mills and/or static mixers using aqueous organic solvents and, if appropriate, further surfactants as have already been mentioned for example above in the case of the other formulation types.

Granules can be prepared either by spraying the active compound onto adsorptive, granulated inert material or by applying active compound concentrates to the surface of carriers such as sand, kaolinites or granulated inert material with the aid of binders, for example polyvinyl alcohol, sodium polyacrylate or else mineral oils. Suitable active compounds may also be granulated in the manner conventionally used for the production of fertilizer granules, if desired in a mixture with fertilizers. As a rule, water-dispersible granules are prepared by customary processes such as spray drying, fluidized-bed granulation, disk granulation, mixing with high-speed mixers and extrusion without solid inert material. Regarding the production of disk granules, fluidized-bed granules, extruder granules and spray granules, see, for example, the methods in "Spray-Drying Handbook" 3rd ed. 1979, G. Goodwin Ltd., London; J. E. Browning, "Agglomeration", Chemical and Engineering 1967, page 147 et seq; "Perry's Chemical Engineer's Handbook", 5th Ed., McGraw-Hill, New York 1973, pp. 8-57.

As regards further details on the formulation of crop protection products, see, for example, G. C. Klingmam, "Weed Control as a Science", John Wiley and Sons, Inc., New York, 1961, pages 81-96 and J. D. Freyer, S. A. Evans, "Weed Control Handbook", 5th Ed., Blackwell Scientific Publications, Oxford, 1968, pages 101-103.

As a rule, the agrochemical formulations comprise 1 to 95% by weight, of active compounds, the following concentrations being customary, depending on the type of formulation:

The active compound concentration in wettable powders is, for example, approximately 10 to 95% by weight, the remainder to 100% by weight being composed of customary formulation constituents. In the case of emulsifiable concentrates, the active compound concentration may amount to, for example, 5 to 80% by weight. Formulations in the form of dusts comprise, in most cases, 5 to 20% by weight of active compound, sprayable solutions approximately 0.2 to 25% by weight of active compound. In the case of granules such as dispersible granules, the active compound content depends partly on whether the active compound is present in liquid or solid form and on which granulation auxiliaries and fillers are being used. As a rule, the content amounts to between 10 and 90% by weight in the case of the water-dispersible granules.

In addition, the abovementioned active compound formulations may comprise, if appropriate, the conventional adhesives, wetters, dispersants, emulsifiers, preservatives, antifreeze agents, solvents, fillers, colorants, carriers, antifoams, evaporation inhibitors, pH regulators or viscosity regulators.

The herbicidal action of the herbicide combinations according to the present invention can be improved, for example, by surfactants, preferably by wetters from the group of the fatty alcohol polyglycol ethers. The fatty alcohol polyglycol ethers preferable contain 10-18 carbon atoms in the fatty alcohol radical and 2-20 ethylene oxide units in the polyglycol ether moiety. The fatty alcohol polyglycol ethers can be nonionic or ionic, for example in the form of fatty alcohol poly glycol ethers sulfates, which can be used, for example, as alkali metal salts (e.g. sodium salts or potassium salts) or ammonium salts, but also as alkaline earth metal salts such as magnesium salts, such as sodium $C_{12}/C_{14}$-fatty alcohol diglycol ether sulfate (Genapol® LRO, Clariant); see, for example, EP-A-0476555, EP-A-0048436, EP-A-0336151 or U.S. Pat. No. 4,400,196 and also Proc. EWRS Symp. "Factors Affecting Herbicidal Activity and Selectivity", 227-232 (1988). Nonionic fatty alcohol polyglycol ethers are, for example, ($C_{10}$-$C_{18}$)-, preferably ($C_{10}$-$C_{14}$)-fatty alkohol polyglycol ethers containing 2-20, preferably 3-15, ethylene oxide units (e.g. isotridecyl alcohol polyglycol ether), for example from the Genapol® series, such as Genapol® X-030, Genapol® X-060, Genapol® X-080 or Genapol® X-150 (all from Clariant GmbH).

The present invention furthermore embraces the combination of herbicides (i) and (ii) as defined above with the wetting agents mentioned above from the group of the fatty alcohol polyglycolethers which preferably contain 10-18 carbon atoms in the fatty alcohol radical and 2-20 ethylene oxide units in the polyglycol ether moiety and which can be present in nonionic or ionic form (for example as fatty alcohol polyglycol ether sulfates). Preference is given to $C_{12}/C_{14}$-fatty alcohol diglycol ether sulfate sodium (Genapol® LRO, Clariant); and isotridecyl alcohol polyglycol ether with 3-15 ethylene oxide units, for example from the Genapol® X series, such as Genapol® X-030, Genapol® X-060, Genapol® X-080 or Genapol® X-150 (all from Clariant GmbH). It is furthermore known that fatty alcohol polyglycol ethers such as nonionic or ionic fatty alcohol polyglycol ethers (for example fatty alcohol poly glycol ether sulfates) are also suitable for use as penetrants and activity enhancers for a number of other herbicides, inter alia also for herbicides from the group of the imidazolinones (see, for example, EP-A-0502014).

Moreover, it is known that fatty alcohol polyglycol ethers such as nonionic or ionic fatty alcohol polyglycol ethers (for example fatty alcohol polyglycol ether sulfates) are also suitable as penetrants and synergists for a number of other herbicides, inter alia also herbicides from the group of the imidazolinones; (see, for example, EP-A-0502014).

The herbicidal effect of the herbicide combinations according to the present invention can also be increased using vegetable oils. The term vegetable oils is to be understood as meaning oils from oil-plant species, such as soya oil, rapeseed oil, corn oil, sunflower oil, cottonseed oil, linseed oil, coconut oil, palm oil, safflower oil or castor oil, in particular rapeseed oil, and their transesterification products, for example alkyl esters, such as rapeseed oil methyl ester or rapeseed oil ethyl ester.

The vegetable oils are preferably esters of $C_{10}$-$C_{22}$-, preferably $C_{12}$-$C_{20}$-fatty acids. The $C_{10}$-$C_{22}$-fatty acid esters are, for example, esters of unsaturated or saturated $C_{10}$-$C_{22}$-fatty acids, in particular those with an even number of carbon atoms, for example erucic acid, lauric acid, palmitic acid and, in particular, $C_{18}$-fatty acids such as stearic acid, oleic acid, linoleic acid or linolenic acid.

Preferred $C_1$-$C_{20}$-alkyl-$C_{10}$-$C_{22}$-fatty acid esters are the methyl, ethyl, propyl, butyl, 2-ethylhexyl and dodecyl esters. Preferred glycol- and glycerol-$C_{10}$-$C_{22}$-fatty acid esters are the uniform or mixed glycol esters and glycerol esters of $C_{10}$-$C_{22}$-fatty acids, in particular those fatty acids which have an even number of carbon atoms, for example erucic acid, lauric acid, palmitic acid and, in particular, $C_{18}$-fatty acids such as stearic acid, oleic acid, linolic acid or linolenic acid.

The vegetable oils can be present in the herbicidal compositions according to the present invention for example in the form of commercially available oil-containing formulation additives, in particular those based on rapeseed oil such as Hasten® (Victorian Chemical Company, Australia, hereinbelow termed Hasten, main constituent: rapeseed oil ethyl ester), Actirob®B (Novance, France, hereinbelow termed ActirobB, main constituent: rapeseed oil methyl ester), Rako-Binol® (Bayer AG, Germany, termed Rako-Binol hereinbelow, main constituent: rapeseed oil), Renol® (Stefes, Germany, termed Renol hereinbelow, vegetable oil constituent: rapeseed oil methyl ester), or Stefes Mero® (Stefes, Germany, hereinbelow termed Mero, main constituent: rapeseed oil methyl ester).

For use, the formulations, which are present in commercially available form, are optionally diluted in the customary manner, for example using water in the case of wettable powders, emulsifiable concentrates, dispersions and water-dispersible granules. Preparations in the form of dusts, soil granules, granules for broadcasting and sprayable solutions are usually not diluted further with other inert substances prior to use.

A herbicide combination according to the present invention and a composition comprising the herbicide combination as defined in the context of the present invention are preferably applied to the harmful plants or undesired plants or parts thereof, seeds of the plants or the area under cultivation (soil of a field), preferably to the green of the harmful plants or parts thereof, or to the green parts of the undesired plants or parts thereof.

A composition comprising a herbicide combination used in the context of the present invention has the advantage of being easier to apply since the quantities of the components are already presented in the correct ratio to each other. Moreover, the adjuvants in the formulation can be matched optimally to each other.

As already described in more detail above, the present invention further relates to the use of combination of herbicides according to the present invention (preferably in one of the preferred embodiments defined herein) or a composition according to the present invention (preferably in one of the preferred embodiments defined herein) in the field of agriculture, in particular as plant growth regulators and/or for controlling harmful plants or undesired plant growth.

EXAMPLES

The following data are the results of a greenhouse investigation in which the herbicide combination according to the present invention was tested against various monocotyledonous and dicotyledonous weeds after an early-post emergence application (BBCH 10-11).

The following weeds were selected for testing:

TABLE 2

| Target | Bayer code | Species |
|---|---|---|
| Lolium rigidum | LOLRI | Ryegrass, rigid |
| Polygonum convolvulus | POLCO | Bindweed, black |
| Lamium purpureum | LAMPU | Deadnettle, red |
| Matricaria inodora | MATIN | Daisy, horse |
| Veronica persica | VERPE | Speedwell, common field |
| Pharbitis purpurea | PHBPU | Morningglory, common |

For this early post-emergent trial seeds of the above mentioned species were sown in 7 cm jiffy pots containing standard soil (14.7% sand, 19.9% clay, 65.4% silt and 1.8% organic matter) covered with 0,5 cm depth of sandy soil and lightly irrigated from above. The pots were placed in a glasshouse (with conditions of 16 hour day and 8 hour night, 21° C. day and 12° C. night and 60% relative humidity) and irrigated from above to allow the seeds to germinate and grow. Once they had reached the required growth stage BBCH 10-11 the propagated plants were treated with the herbicides. The herbicides were applied in a spray volume of 300 l water/ha using a flat fan nozzle XR 8001 at a pressure of 1.8 bar. After the application and air drying the pots were placed back into the glasshouse and allowed to grow on. The pots were irrigated via flood irrigation as required for good plant growth. The treatments are shown in table below.

TABLE 3

| No | Active Ingredient | Formulation | Dose Rate in g ai/ha |
|---|---|---|---|
| 1 | Untreated | | |
| 2 | Diflufenican | SC 500 (500 g/l) | 50 |
| 3 | Pyroxasulfone | WG 850 (850 g/kg) | 25 |
| 4 | Metribuzin | SC 480 (480 g/l) | 50 |
| 5 | Diflufenican + Pyroxasulfone + Metribuzin | SC 500 + WG 850 + SC 480 | 50 + 25 + 50 |

Visual percent of weed control (4 replicates) was rated 20 days after herbicide applications (DAA) on a scale of 0-100. A rating of 0 is defined as no control and 100 as complete control.

According to Colby synergistic effects of herbicidal active ingredients are indicated if the measured efficacy is higher than the expected one calculated according to his formula for 3-way mixtures:

$$E=(A+B+C)-(A\times B+A\times C+B\times C)/100+(A\times B\times C)/10000$$

The combination of diflufenican, pyroxasulfone and metribuzin at the above mentioned dose rates showed very high efficacy, clearly higher than expected according to Colby, against all target weeds tested; particularly high against *Polygonum convolvulus, Matricaria inodora* and *Veronica persica*. This indicates clear synergism between these three active ingredients.

TABLE 4

| | | % Efficacy against various weeds | | | | | |
|---|---|---|---|---|---|---|---|
| Treatment | Dose Rate in g ai/ha | LOLRI | POLCO | LAMPU | MATIN | VERPE | PHBPU |
| Diflufenican | 50 | 2 | 13 | 10 | 1 | 18 | 18 |
| Pyroxasulfon | 25 | 29 | 0 | 5 | 5 | 5 | 10 |
| Metribuzin | 50 | 6 | 1 | 95 | 59 | 70 | 5 |
| Diflufenican + Pyroxasulfone + Metribuzin | 50 + 25 + 50 | 41 | 95 | 100 | 99 | 100 | 44 |
| Colby expected | | 35 | 14 | 96 | 61 | 77 | 30 |
| Δ measured/expected | | +6 | +81 | +4 | +38 | +23 | +14 |
| Synergy (yes/no) | | yes | yes | yes | yes | yes | yes |

The invention claimed is:

1. A combination of herbicides comprising
   (i) diflufenican,
   (ii) pyroxasulfone and
   (iii) metribuzin, wherein the combination of (i), (ii), and (iii) is synergistic in comparison to (i), (ii), or (iii) alone.

2. The combination according to claim 1 wherein the combination comprises at least one safener.

3. The combination according to claim 1 wherein the combination comprises mefenpyr-diethyl or cyprosulfamide.

4. The combination according to claim 1 wherein the combination comprises at least one additional herbicidal active ingredient selected from aclonifen, bromoxynil, bromoxynil-butyrate, -potassium, -heptanoate, and -octanoate, benzofenap, butachlor, 2,4-D, 2,4-D-butotyl, -butyl, -dimethylammonium, -diolamin, -ethyl, -2-ethylhexyl, -isobutyl, -isooctyl, -isopropyl-ammonium, -potassium, -triisopropanolammonium, and trolamine, diflufenican, dimethenamid, ethoxysulfuron, fenoxaprop, fenoxaprop-P, fenoxaprop-ethyl, fenoxaprop-P-ethyl, fenquinotrione, fentrazamide, florasulam, flufenacet, fluroxypyr, fluroxypyr-meptyl, foramsulfuron, iodosulfuron, iodosulfuron-methyl-sodium, isoproturon, isoxaflutole, mefenacet, mesosulfuron, mesosulfuron-methyl, metolachlor, S-metolachlor, metribuzin, metosulam, nicosulfuron, oxadiargyl, oxadiazon, pethoxamid, prosulfocarb, pyrasulfotole, pyroxsulam, tefuryltrione, tembotrione, thiencarbazone, thiencarbazone-methyl, triafamone, pendimethalin, propoxycarbazone, halauxifen-methyl, and 2-methyl-4-chlorophenoxyacetic acid (MCPA).

5. The combination according to claim 1 wherein the ratio by weight of the total amount of component (i) to the total amount of component (ii) is in the range of from 1000:1 to 1:1000 and the ratio by weight of the total amount of component (i) to the total amount of component (iii) is 1000:1 to 1:1000.

6. An herbicidal composition, which comprises in addition to the combination according to claim 1 one or more further component(s) selected from the group consisting of formulation auxiliaries, additives customary in crop protection, and further agrochemically active compounds.

7. A method for controlling one or more weed plants in one or more crops of useful plants, comprising applying a herbicidal combination of claim 1 or composition, which comprises in addition to the combination according to claim 1 one or more further component(s) selected from the group consisting of formulation auxiliaries, additives customary in crop protection, and further agrochemically active compounds to the weed plants, crop plants or crop plant seeds or to an area on which weed or crop plants are growing.

8. The method according to claim 7, wherein the crop plants are soybean.

9. The method according to claim 7, wherein the crop plants have been genetically modified.

10. The method according to claim 7, that is carried out pre-emergence or early post-emergence.

11. The method for producing a combination of herbicides as defined in claim 1 or a composition thereof, comprising
   (a) providing component (i),
   (b) providing component (ii),
   (c) providing component (iii),
   (d) combining component (i), component (ii) and component (iii),
   such that the combination of herbicides as defined in claim 1 or a composition which comprises in addition to the combination according to claim 1 one or more further component(s) selected from the group consisting of formulation auxiliaries, additives customary in crop protection, and further agrochemically active compounds is obtained.

12. A product comprising a combination of herbicides as defined in claim 1 or a composition which comprises in addition to the combination according to claim 1 one or more further component(s) selected from the group consisting of formulation auxiliaries, additives customary in crop protection, and further agrochemically active compounds in the field of agriculture.

13. The combination according to claim 1 wherein the ratio by weight of the total amount of component (i) to the total amount of component (ii) is in the range of from 100:1 to 1:100, and the ratio by weight of the total amount of component (i) to the total amount of component (iii) is in the range of from 1:100 to 100:1.

14. The combination according to claim 1 wherein the ratio by weight of the total amount of component (i) to the total amount of component (ii) is in the range of from 1:10 to 10:1, and the ratio by weight of the total amount of component (i) to the total amount of component (iii) is in the range of from 1:10 to 10:1.

* * * * *